(12) United States Patent
Chen

(10) Patent No.: US 11,841,944 B2
(45) Date of Patent: Dec. 12, 2023

(54) PARAMETER CHECKING SYSTEM AND PARAMETER CHECKING METHOD

(71) Applicant: Nuvoton Technology Corporation, Hsinchu Science Park (TW)

(72) Inventor: Shun-Hsiung Chen, Hsinchu Science Park (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 73 days.

(21) Appl. No.: 17/564,528

(22) Filed: Dec. 29, 2021

(65) Prior Publication Data

US 2022/0405388 A1 Dec. 22, 2022

(30) Foreign Application Priority Data

Jun. 17, 2021 (TW) ................. 110122036

(51) Int. Cl.
*G06F 21/55* (2013.01)
*G06F 21/54* (2013.01)
(Continued)

(52) U.S. Cl.
CPC ........ *G06F 21/554* (2013.01); *G06F 11/1004* (2013.01); *G06F 11/1068* (2013.01);
(Continued)

(58) Field of Classification Search
CPC .. G06F 21/554; G06F 21/755; G06F 11/1004; G06F 11/1068; G06F 21/54; G06F 21/556; G06F 21/602
See application file for complete search history.

(56) References Cited

U.S. PATENT DOCUMENTS 8,037,530 B1 * 10/2011 Fink ................... H04L 61/2539
713/153
8,261,062 B2 9/2012 Aura et al.
(Continued)

FOREIGN PATENT DOCUMENTS

CN 102625939 B 2/2017
CN 112422272 A 2/2021
(Continued)

OTHER PUBLICATIONS

Office Action dated Sep. 21, 2022 in TW Application No. 110122037, 12 pages.
(Continued)

*Primary Examiner* — Ayoub Alata
(74) *Attorney, Agent, or Firm* — Muncy, Geissler, Olds & Lowe, P.C.

(57) ABSTRACT

A parameter checking method includes substituting a plurality of initial parameters into a data integrity algorithm to obtain syndrome data using a processor, and using a hardware cipher to calculate a calculation result based on the data integrity algorithm based on a plurality of calculation parameters corresponding to the initial parameters. Moreover, when the processor determines that the syndrome data is not the same as the calculation result, the processor outputs a hacker attack message, indicating that at least one of the calculation parameters has been tampered with.

8 Claims, 3 Drawing Sheets

(51) Int. Cl.
    *G06F 11/10* (2006.01)
    *G06F 21/75* (2013.01)
    *G06F 21/60* (2013.01)
(52) U.S. Cl.
    CPC ............ *G06F 21/54* (2013.01); *G06F 21/556* (2013.01); *G06F 21/602* (2013.01); *G06F 21/755* (2017.08)

(56) References Cited

U.S. PATENT DOCUMENTS

2011/0231673 A1    9/2011   Alekseev et al.
2021/0160052 A1    5/2021   Chalker

FOREIGN PATENT DOCUMENTS

| | | | |
|---|---|---|---|
| EP | 3525126 | A1 | 8/2019 |
| TW | 1584152 | B | 5/2017 |
| TW | I-690165 | B | 4/2020 |
| TW | I-727551 | B | 5/2021 |
| TW | 202123048 | * | 6/2021 |

OTHER PUBLICATIONS

An Office Action dated Jan. 4, 2022 in TW Application No. 110122036 is attached, 6 pages.
Office Action dated May 3, 2023 issued in corresponding TW Application No. 110122036, 6 pages.

\* cited by examiner

PARAMETER CHECKING SYSTEM AND PARAMETER CHECKING METHOD

CROSS REFERENCE TO RELATED APPLICATIONS

This Application claims priority of Taiwan Patent Application No. 110122036, filed on Jun. 17, 2021, the entirety of which is incorporated by reference herein. This application is related to Applicant's co-pending U.S. patent application Ser. No. 17/564,286, filed on Dec. 29, 2021, the entirety of which is incorporated by reference herein.

BACKGROUND OF THE INVENTION

Field of the Invention

The present disclosure is related to a checking system and a checking method, and in particular, to a parameter checking system and a parameter checking method for recognizing a voice or image.

Description of the Related Art

In the field of information security, voltage glitch attacks quickly change the voltage input to the chip, which affects certain transistors in the chip, causing one or more output values to be wrong, and the processor will skip or operate incorrectly. As result, the information hidden in the chip can leak out along with errors in the processor. In addition to voltage glitch attacks, there are still many other attack methods that try to obtain encrypted confidential information.

Therefore, how to detect that an encryption and decryption system is being interfered with by a voltage glitch attack method has become one of the problems to be solved in this field.

BRIEF SUMMARY OF THE INVENTION

In accordance with one feature of the present invention, the present disclosure provides a parameter checking system that includes a processor and a hardware cipher. The processor is configured to substitute a plurality of initial parameters into a data integrity algorithm to obtain syndrome data. The hardware cipher is configured to calculate a calculation result based on the data integrity algorithm based on a plurality of calculation parameters corresponding to the initial parameters. When the processor determines that the syndrome data is not the same as the calculation result, the processor outputs a hacker attack message, indicating that at least one of the calculation parameters has been tampered with.

In one embodiment, the data integrity algorithm is a parity check algorithm, a cyclic redundancy check (CRC) algorithm, a message digest algorithm or a block cipher algorithm.

In one embodiment, the initial parameters comprise an initial plaintext source address, an initial key, an initial ciphertext destination address, and the data integrity algorithm; and the calculation parameters comprise a plaintext source address to be calculated, an encryption key, an output ciphertext destination address, and the data integrity algorithm.

In one embodiment, when the processor determines that the syndrome data is the same as the calculation result, the processor outputs a normal operation message, which means that the calculation parameters are correct.

In one embodiment, the processor executes an initialization check program, the initialization check program receives the initial parameters, and substitutes the initial parameters into the data integrity algorithm to obtain the syndrome data.

In accordance with one feature of the present invention, the present disclosure provides a parameter checking method. The parameter checking method includes substituting a plurality of initial parameters into a data integrity algorithm to obtain syndrome data using a processor, and using a hardware cipher to calculate a calculation result based on the data integrity algorithm based on a plurality of calculation parameters corresponding to the initial parameters. Moreover, when the processor determines that the syndrome data is not the same as the calculation result, the processor outputs a hacker attack message, which means that at least one of the calculation parameters has been tampered with.

In one embodiment, the data integrity algorithm is a parity check algorithm, a cyclic redundancy check (CRC) algorithm, a message digest algorithm or a block cipher algorithm.

In one embodiment, the initial parameters comprise an initial plaintext source address, an initial key, an initial ciphertext destination address, and the data integrity algorithm; and the calculation parameters comprise a plaintext source address to be calculated, an encryption key, an output ciphertext destination address, and the data integrity algorithm.

In one embodiment, when the processor determines that the syndrome data is the same as the calculation result, the processor outputs a normal operation message, which means that the calculation parameters are correct.

In one embodiment, the processor executes an initialization check program, the initialization check program receives the initial parameters, and substitutes the initial parameters into the data integrity algorithm to obtain the syndrome data.

It can be seen from the above that with the parameter checking method and parameter checking system of this case, the syndrome data generated based on the correct initial parameters (generated by the processor when it executes the initialization checking program) is compared with the algorithm data generated based on the encryption used during encryption. The calculation result (generated by the hardware encryptor) can be determined by the calculation results of the initial parameters and calculation parameters for each of the software and the hardware to confirm whether each calculation parameter used in encryption is correct. If the calculation result is different from the syndrome data, the processor can send a notification to allow the system to automatically further detect the corrupted data, stop the external access function to block hackers and/or notify the user to check the wrong parameters. In this way, the effect of maintaining the integrity and correctness of the parameters is achieved.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In the steps of some encryption and decryption algorithms (for example, Advanced Encryption Standard (AES) algorithm), there are loopholes for hackers to obtain keys. For example, hackers can use voltage glitch attacks or other attack methods to perform a series of mathematical deductions to obtain the parameters, such as the encryption key, source address and/or target address, etc. The parameters are used to break the encryption process. In the following, the voltage glitch attack method is explained with the FIGS. 1-2.

Figure 1:
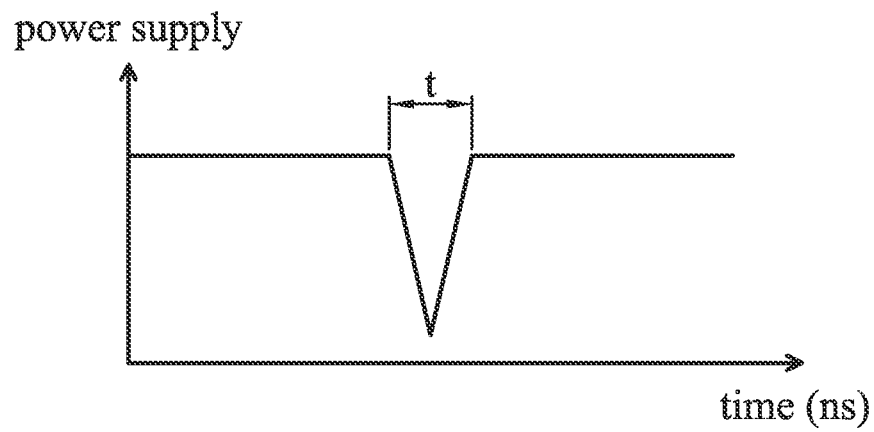
FIG. 1 is a schematic diagram illustrating a power supply state of a voltage glitch attack method in accordance with one embodiment of the present disclosure.
Figure 2:
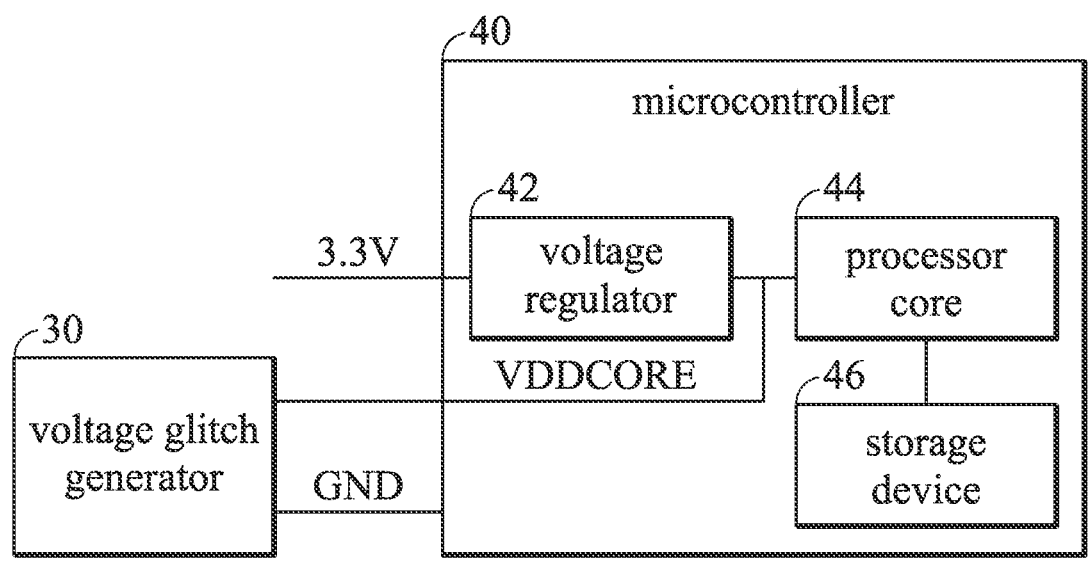
FIG. 2 is a schematic diagram of a voltage glitch attack method in accordance with one embodiment of the present disclosure.

Please refer to FIGS. 1 and 2. FIG. 1 is a schematic diagram illustrating a power supply state of a voltage glitch attack method in accordance with one embodiment of the present disclosure. FIG. 2 is a schematic diagram of a voltage glitch attack method in accordance with one embodiment of the present disclosure.

As shown in FIG. 2, the processor core 44 in the microcontroller 40 can be coupled to a storage device 46, such as a memory of the processor core or a register of the processor core. The processor core 44 can store the encrypted data in the storage device 46, and the processor core 44 can also store the half-time temporary result of the calculation in the storage device 46.

In the example in FIG. 2, when a hacker wants to attack the encrypted data stored in the microcontroller 40, the hacker will connect the voltage glitch generator 30 to the processor core 44 in the microcontroller 40. The line VDD-CORE represents the voltage supplied to the processor core 44. The line GND represents ground. In addition, an external voltage of 3.3 volts is provided to the voltage regulator 42. The voltage regulator 42 is used to output a stable voltage to the processor core 44.

As shown in FIG. 1, the horizontal axis is time (unit is nanoseconds, (ns)), and the vertical axis is the power supply (the unit can be volts). The voltage glitch generator 30 can generate a voltage glitch in a short time interval t (for example, 2 ns), and transmit it to the processor core 44 via the line VDDCORE. For example, the voltage glitch generator 30 quickly pulls down the voltage and immediately returns to the normal voltage.

Figure 3:
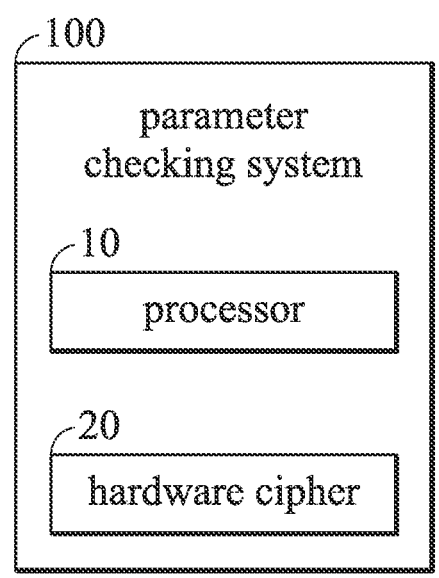
FIG. 3 is a schematic diagram illustrating a parameter checking system in accordance with one embodiment of the present disclosure.

As shown in FIG. 2, since each logic gate or element has a fixed operating voltage during operation, if the operating voltage is destroyed (for example, the operating voltage is destroyed by a voltage glitch), the operation of the logic gate or element will be incorrect. For example, after a voltage glitch temporarily destroys the operating voltage of the processor core 44, it will cause the processor core 44 to make an operation error. The person skilled in the art should understand that the processor core 44 in FIG. 3 is only an example, and it can also be other general logic gates or components. When other logic gates or components are damaged, the operating voltage will also cause operational errors.

In one embodiment, there are many attack methods used by hackers, such as voltage glitch attack method, external high-energy electromagnetic wave generator interference operation, crystal influencing clock frequency (for example, adding convex wave). The voltage glitch attack method may cause the order of instruction execution to be disturbed. In addition, the operating voltage of the electronic components is fixed, and the data access in the memory may be wrong due to hacking attacks. In addition, the data in the logic operation or calculation process is disturbed, which may also cause the encryption and decryption operations to output wrong answers. Furthermore, because some instructions are skipped or data is corrupted, the processor core 44 cannot fill the storage device 46 correctly (for example, implemented by a control register). For example, when the original data to be encrypted is placed at the address 1000 of the control register 46, but the address is changed to 3000 by the hacker's attack method. When the processor core 44 reads data, it will read the wrong data at address 3000.

Therefore, it is necessary to confirm that each calculation parameter in the encryption process is correct through a parameter checking method and a parameter checking system.

Figure 4:
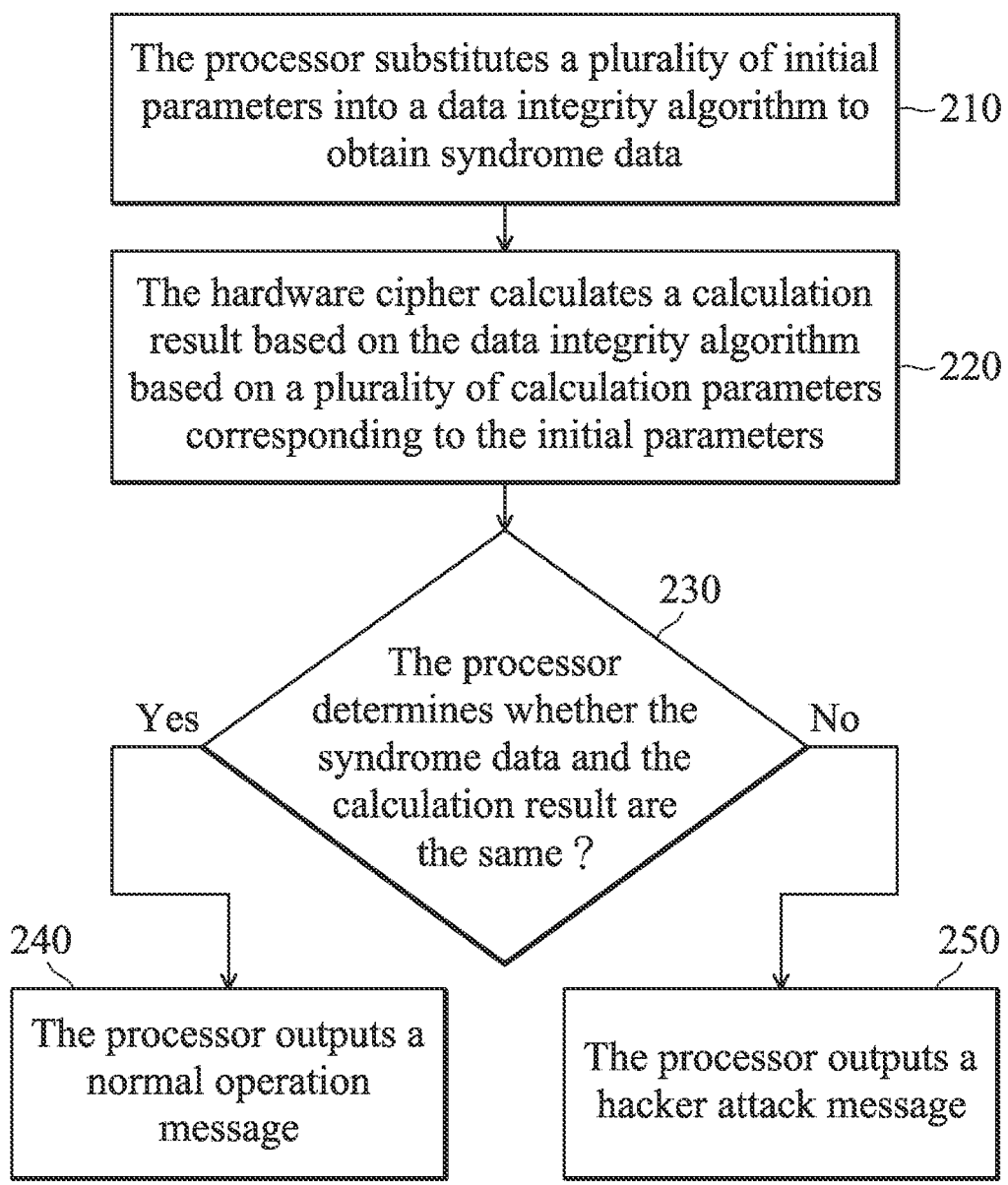
FIG. 4 is a schematic diagram of a parameter checking method in accordance with one embodiment of the present disclosure.

Please refer to FIGS. 3 to 4, FIG. 3 is a schematic diagram illustrating a parameter checking system 100 in accordance with one embodiment of the present disclosure. FIG. 4 is a schematic diagram of a parameter checking method 200 in accordance with one embodiment of the present disclosure.

In FIG. 3, the parameter checking system 100 includes a processor 10 and a hardware cipher 20.

In one embodiment, the processor 10 may be implemented by a volume circuit such as a micro controller, a microprocessor, a digital signal processor, an application specific integrated circuit (ASIC) or a logic circuit.

In one embodiment, the hardware cipher 20 can be a hardware scrambling device. In one embodiment, the hardware cipher 20 can be implemented by a crypto engine.

In an embodiment, the parameter checking method 200 shown in FIG. 4 may be implemented by the parameter checking system 100.

In step 210, the processor 10 substitutes a plurality of initial parameters into a data integrity algorithm to obtain syndrome data.

In one embodiment, the data integrity algorithm is a parity check algorithm, a cyclic redundancy check (CRC) algorithm, a message digest algorithm or a block cipher algorithm.

In one embodiment, when checking the data integrity, a data integrity algorithm must be selected to perform the data integrity check. For example, using cyclic redundant check 4 (CRC4), a simple CRC4 algorithm is used as an example below. For example, the original polynomial X5+X4+1 is selected as the generator polynomial of the CRC4 algorithm. If we use X5+X4+1 to check the one-byte input data "11100110" (that is, the input parameter), then the rest is 0110 (X2+X). The remaining X2+X is called syndrome data, which can be used to check whether the input parameter "11100110" is damaged. If the software of the data integrity algorithm requires performing the advanced encryption standard cipher-block chaining (AES CBC) encryption calculation, then the hardware cipher 20 will cascade all necessary parameters (for example, initial vector, symmetric key, source data address, destination buffer address and data length) according to a clearly defined sequence and perform a CRC4 calculation check. If the calculated result is the same as the syndrome data, all parameters are correct. If the calculation result is different from the syndrome data, it means that the microcontroller 40 has been attacked by fault injection. The hardware cipher 20 can notify existing security defense software (such as PC-cillin, Kaspersky, Symantec . . . and other security software) to take relevant actions to remove malware or shut down the system to protect it.

In one embodiment, the CRC4 algorithm has the characteristic of easily avoiding syndrome collision attacks. Therefore, a secure hash algorithm (SHA) can be added to the data integrity algorithm to make the message digest of the data integrity algorithm. Thus, if we use SHA-256 for data integrity checking algorithm, the software of the data integrity algorithm needs to cascade the required parameters and perform SHA-256 calculation to generate 256-bit syndrome data. Before the encryption/decryption calculation, the encryption engine needs to perform the same SHA-256 calculation and compare the result with the syndrome data. Following a series of checks to check the integrity of the data is sufficient to prove that the hardware cipher 20 can protect the encryption/decryption calculation from fault injection attacks.

In one embodiment, the hardware cipher 20 can also use the AES CBC mode for checking data integrity. The input data is the cascaded result of the parameters required for this encryption/decryption. If the cascaded data is not 128 bits (block size), it can be filled by "0" to reach 128 bits. The software of data integrity algorithm can use pre-defined initial vector and key to perform AES CBC calculation, and the calculated 128-bit cipher result can be used as the syndrome data. The hardware cipher 20 needs to follow the same definition to calculate AES CBC mode encryption, and finally uses 128-bit syndrome data for checking data integrity.

In one embodiment, the initial parameters include an initial plaintext source address, an initial key, an initial ciphertext destination address, and a data integrity algorithm.

In one embodiment, the processor 10 executes an initialization check program, the initialization check program receives these initial parameters, and substitutes these parameters into the data integrity algorithm to obtain the syndrome data.

In step 220, the hardware cipher 20 calculates a calculation result based on the data integrity algorithm based on a plurality of calculation parameters corresponding to the initial parameters.

In one embodiment, the calculation parameters include a plaintext source address to be calculated, an encryption key, an output ciphertext destination address, and the data integrity algorithm.

In one embodiment, the data integrity algorithm in the calculation parameters is the same as the data integrity algorithm in the initial parameters. For example, the data integrity algorithm in the initial parameters uses a parity check algorithm, and the data integrity algorithm in the calculation parameters must also use the same parity check algorithm.

In step 230, the processor 10 determines whether the syndrome data and the calculation result are the same. If the processor 10 determines that the syndrome data is the same as the calculation result, step 240 is performed. If the processor 10 determines that the syndrome data and the calculation result are not the same, step 250 is performed.

For example, suppose that the encryption operation of AES requires 4 words (i.e., 32-bit) operation, generally speaking, the encryption operation of AES can use more bits. For the convenience of explanation, 32 bits are used as an example here. In addition, assuming that the initial plaintext source address, initial key, and initial ciphertext destination address in the initial parameters are each 32 bits, the processor 10 substitutes these parameters into the parity check algorithm. The parity check algorithm here is, for example, XOR the initial plaintext source address, initial key, and initial ciphertext destination address in sequence (for example, the formula is expressed as: initial plaintext source address XOR initial key XOR initial ciphertext destination address) to obtain syndrome data. On the other hand, assuming that the source address of the plaintext to be calculated, the encryption key, and the destination address of the output ciphertext in the calculation parameters are each 32 bits, the hardware cipher 20 substitutes these parameters into the parity check algorithm. The parity check algorithm here is the same as the way of processing the initial parameters mentioned above. That is, the hardware cipher 20 performs an XOR operation on the source address of the plaintext to be calculated, the encryption key, and the destination address of the output ciphertext in sequence (for example, the formula is expressed as: operation plaintext source address XOR encryption key XOR destination address of the output ciphertext) to get the calculation result.

In one embodiment, under normal circumstances, the initial plaintext source address, initial key, and initial ciphertext destination address of the AES encryption operation are fixed. Therefore, the processor 10 determines whether the syndrome data (generated by the processor 10 when it executes the initialization check program) and the calculation result (generated by the hardware cipher 20) are the same, and the processor 10 can know whether the calculation parameters are abnormal.

In other words, the syndrome data generated by software at the beginning should be the same as the calculation parameters generated by hardware, which represents the normal condition that none of the above parameters have been tampered with.

In step 240, the processor 10 outputs a normal operation message, indicating that these calculation parameters are correct.

In step 250, the processor 10 outputs a hacker attack message, which represents that at least one of these calculation parameters has been tampered with.

In one embodiment, the processor 10 outputs a hacker attack message to represent that the hacker has tampered with at least one of these calculation parameters. In one embodiment, the processor 10 can send a notification to allow the system to automatically further detect damaged data (for example, compare each initial parameter with each corresponding calculation parameter), and stop the external access function to prevent hackers and/or notify the user to check the wrong parameter.

It can be seen from the above that with the parameter checking method and parameter checking system of this case, the syndrome data generated based on the correct initial parameters (generated by the processor when it executes the initialization checking program) is compared with the algorithm data generated based on the encryption used during encryption. The calculation result (generated by the hardware encryptor) can be determined by the calculation results of the initial parameters and calculation parameters for each of the software and the hardware to confirm whether each calculation parameter used in encryption is correct. If the calculation result is different from the syndrome data, the processor can send a notification to allow the system to automatically further detect the corrupted data, stop the external access function to block hackers and/or notify the user to check the wrong parameters. In this way, the effect of maintaining the integrity and correctness of the parameters is achieved.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A parameter checking system, comprising:
   a processor, configured to substitute a plurality of initial parameters into a data integrity algorithm to obtain syndrome data; and
   a hardware cipher, configured to calculate a calculation result based on the data integrity algorithm based on a plurality of calculation parameters corresponding to the initial parameters;
   wherein when the processor determines that the syndrome data is not the same as the calculation result, the processor outputs a hacker attack message, wherein the hacker attack message means that at least one of the calculation parameters has been tampered with;
   wherein the initial parameters comprise an initial plaintext source address, an initial key, an initial ciphertext destination address, and the data integrity algorithm; and
   the calculation parameters comprise a plaintext source address to be calculated, an encryption key, an output ciphertext destination address, and the data integrity algorithm.

2. The parameter checking system of claim 1, wherein the data integrity algorithm is a parity check algorithm, a cyclic redundancy check (CRC) algorithm, a message digest algorithm or a block cipher algorithm.

3. The parameter checking system of claim 1, wherein when the processor determines that the syndrome data is the same as the calculation result, the processor outputs a normal operation message, wherein the normal operation message means that the calculation parameters are correct.

4. The parameter checking system of claim 1, wherein the processor executes an initialization check program, and the initialization check program receives the initial parameters, and substitutes the initial parameters into the data integrity algorithm to obtain the syndrome data.

5. A parameter checking method, comprising:
   substituting a plurality of initial parameters into a data integrity algorithm to obtain syndrome data using a processor; and
   calculating a calculation result based on the data integrity algorithm based on a plurality of calculation parameters corresponding to the initial parameters using a hardware cipher;
   wherein when the processor determines that the syndrome data is not the same as the calculation result, the processor outputs a hacker attack message, wherein the hacker attack message means that at least one of the calculation parameters has been tampered with;
   wherein the initial parameters comprise an initial plaintext source address, an initial key, an initial ciphertext destination address, and the data integrity algorithm; and
   the calculation parameters comprise a plaintext source address to be calculated, an encryption key, an output ciphertext destination address, and the data integrity algorithm.

6. The parameter checking method of claim 5, wherein the data integrity algorithm is a parity check algorithm, a cyclic redundancy check (CRC) algorithm, a message digest algorithm or a block cipher algorithm.

7. The parameter checking method of claim 5, wherein when the processor determines that the syndrome data is the same as the calculation result, the processor outputs a normal operation message, wherein the normal operation message means that the calculation parameters are correct.

8. The parameter checking method of claim 5, further comprising:
   executing an initialization check program with the processor;
   wherein the initialization check program receives the initial parameters, and substitutes the initial parameters into the data integrity algorithm to obtain the syndrome data.

* * * * *